United States Patent [19]
Fischer

[11] 3,787,115
[45] Jan. 22, 1974

[54] INDEXING MECHANISM
[75] Inventor: Joerg Fischer, Wilmette, Ill.
[73] Assignee: Bell and Howell, Chicago, Ill.
[22] Filed: Jan. 26, 1972
[21] Appl. No.: 220,952

[52] U.S. Cl. ............................ 352/123, 274/4 F
[51] Int. Cl. ..................................... G03b 21/04
[58] Field of Search ............... 352/123, 8; 274/4 F

[56] References Cited
UNITED STATES PATENTS
| | | | |
|---|---|---|---|
| 3,561,853 | 2/1971 | Thevenaz | 352/123 |
| 3,188,091 | 6/1965 | Goodell | 274/4 F X |
| 3,512,786 | 5/1970 | Ban | 274/4 F |
| 3,244,378 | 4/1966 | Rost | 274/4 F |

Primary Examiner—Monroe H. Hayes
Attorney, Agent, or Firm—Charles E. Quarton

[57] ABSTRACT

An indexing mechanism for sequentially presenting each of a plurality of cassettes containing photographic film to a projection station in a film projector. The indexing mechanism includes an escapement member having two pairs of stop members that are alternately placed in and out of engagement abutments on the cassette.

4 Claims, 9 Drawing Figures

3,787,115

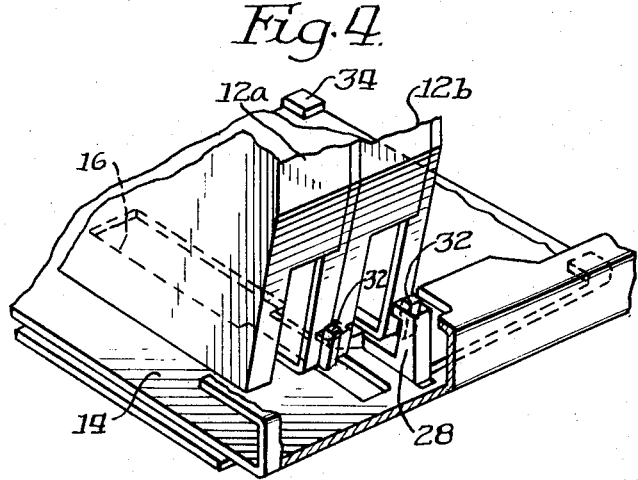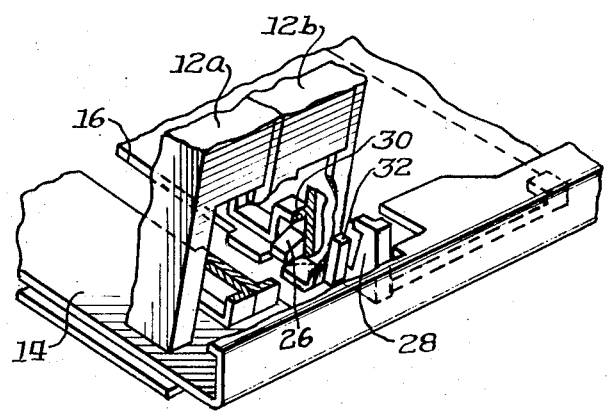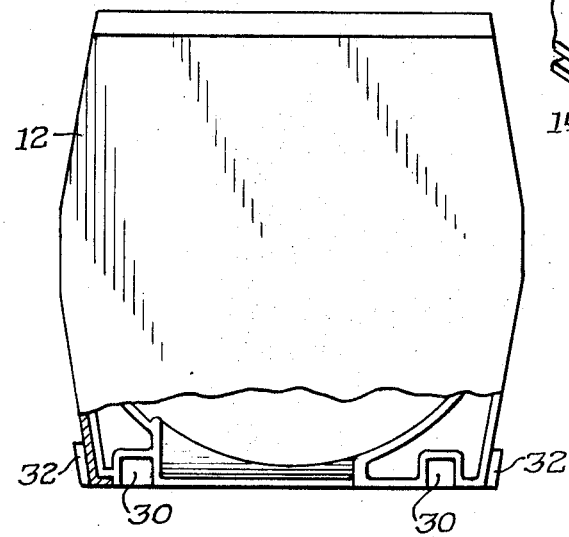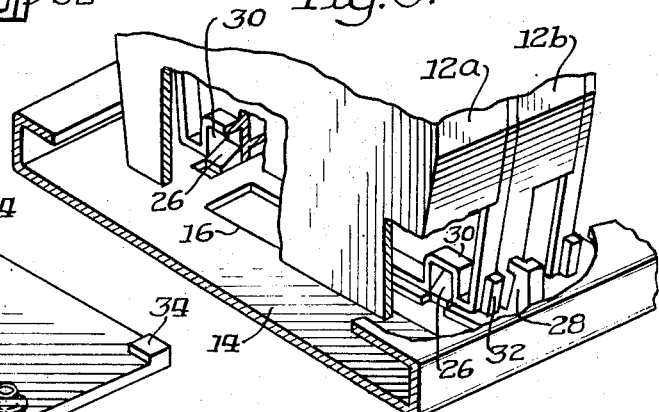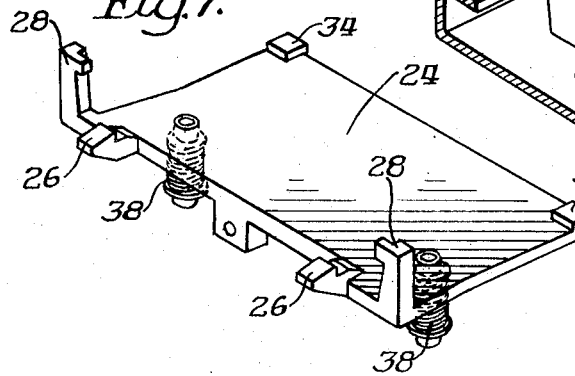

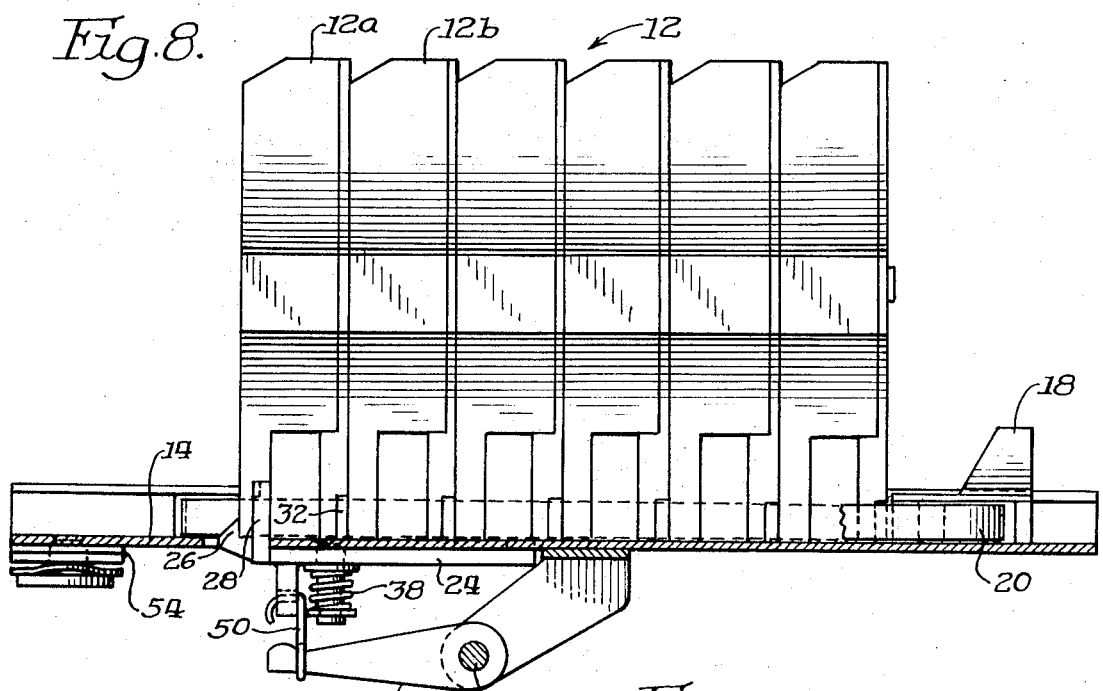
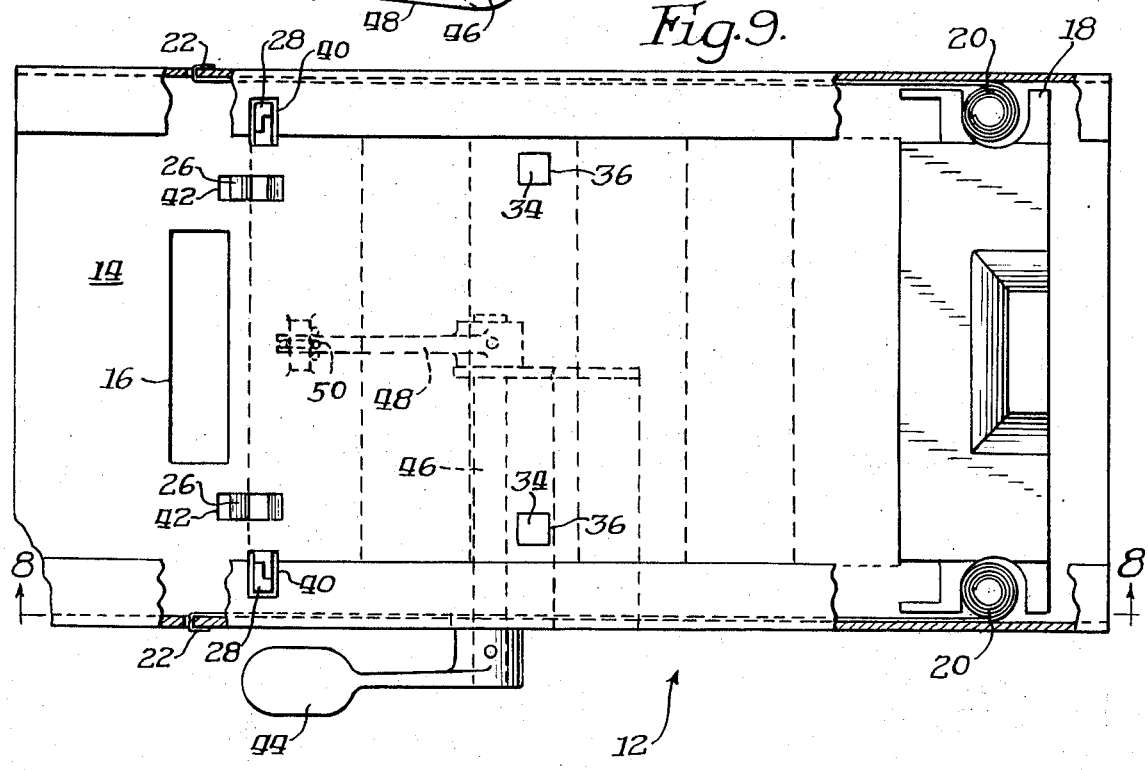

INDEXING MECHANISM

BACKGROUND OF THE INVENTION

This invention relates to film projectors and in particular to an indexing mechanism for a movie projector capable of handling film stored in a plurality of cassettes.

Movie projectors have been developed which project film contained in a cassette. Some of these projectors are designed to accept a plurality of cassettes, usually stacked in side by side relation, and to sequentially project the film contained in each cassette. These projectors required an indexing mechanism to cycle the cassettes into and out of the projection station.

Some prior projectors have included a tray or carriage into which the cassettes are placed and indexing mechanism which indexes the tray. Because of the presence of the tray a great number of parts have been required and in general the prior indexing mechanisms have been quite complex.

SUMMARY OF THE INVENTION

To overcome the difficulties present in the prior art this invention presents an indexing mechanism which does not require a movable tray. Furthermore, a simplified indexing mechanism including a reciprocating escapement member having two pair of stop members which alternately engage respective abutment members formed on the cassette to index a supply of cassettes sequentially to the projection station. The escapement member may be activated manually or by any suitable means.

BRIEF DESCRIPTION OF THE DRAWINGS

The features of this invention will become more apparent in the following description of the preferred embodiment read in conjunction with the figures in which:

FIG. 3 is a perspective view of part of FIG. 1 showing the first cassette at the projection station.

FIG. 4 is a perspective view of part of FIG. 1 showing the second cassette in an intermediate step position.

FIG. 5 is a perspective view of part of FIG. 1 showing the second cassette at the projection station.

FIG. 6 is an end view of a cassette for use with this invention.

FIG. 7 is a perspective view of an escapement member for use in this invention.

FIG. 8 and 9 are plan views of FIG. 1.

DETAILED DESCRIPTION OF THE PREFERRED EMBODIMENT

Figure 1:
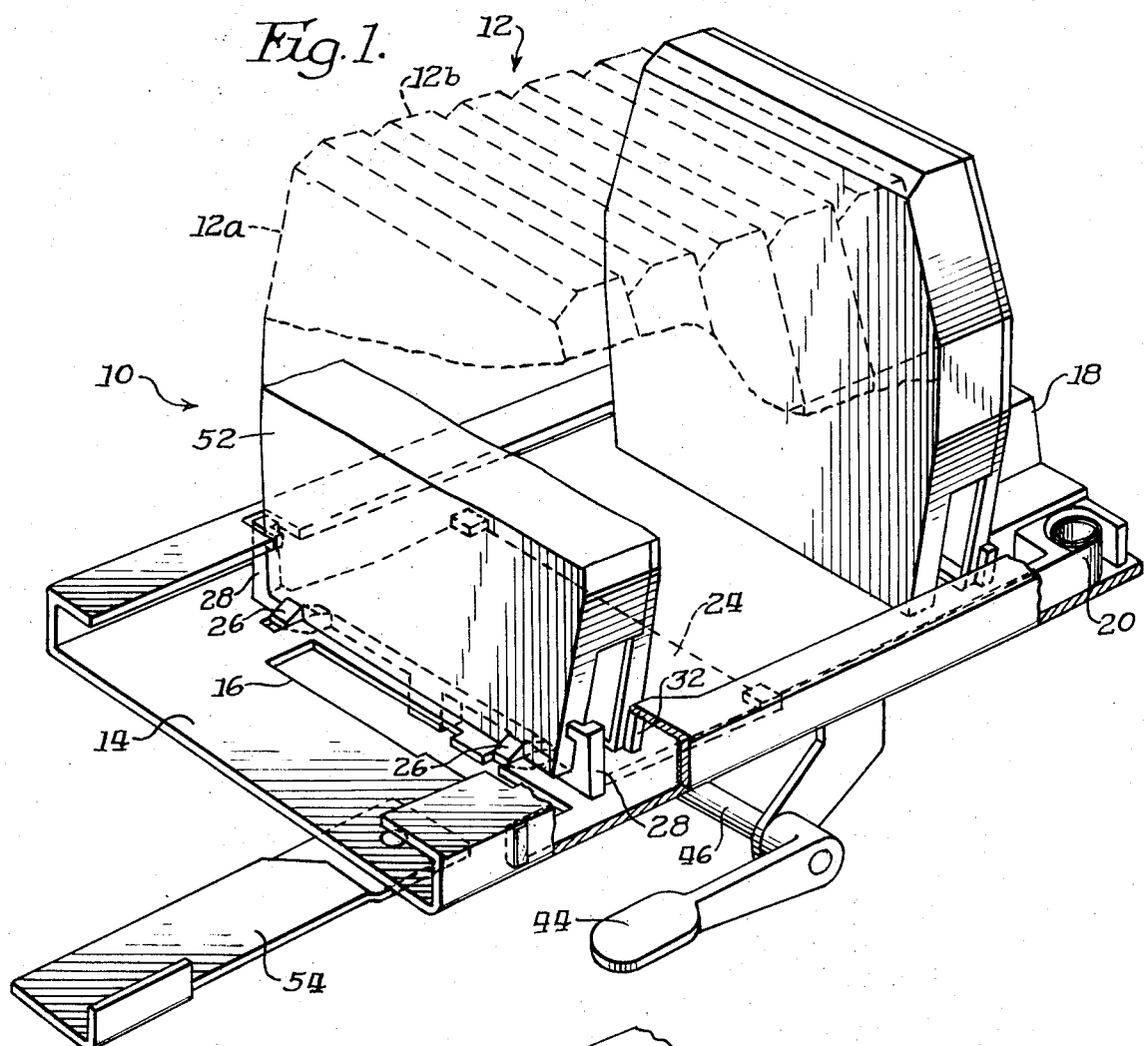
FIG. 1 is a perspective view of an indexing mechanism constructed in accordance with this invention having a supply of cassettes located therein.

Referring to the figures wherein like reference numerals indicate like parts, a supply station for a cassette loaded movie projctor is indicated generally at 10. A supply of six cassettes 12 are depicted in FIG. 1 and are positioned in a well 14. Because it is not necessary to an understanding of this invention the movie projector has not been illustrated. However, it would include all the necessary components for extracting film from the cassettes 12 and projecting them.

An aperture 16 is formed in the well 14 and because it would include all the necessary mechanisms for extracting the film from the cassettes 12 and transporting it through the projector, it will be referred to as the projection station. A pusher 18 urges the supply toward the projection station 16 through the action of a pair of negator springs 20. As seen in FIG. 9 the negator springs 20 are coupled to the side walls of the well 14 at 22.

A cassette 12 for use in this preferred embodiment is depicted in FIG. 6. The cassette is split longitudinally and is open at the bottom to permit the extraction of film. A pair of front abutments 30 are formed in the lower edge of the rear face of the cassette 12. A pair of side abutments 32 extend outwardly from the lower edge of the rear face of the cassette 12.

Figure 2:
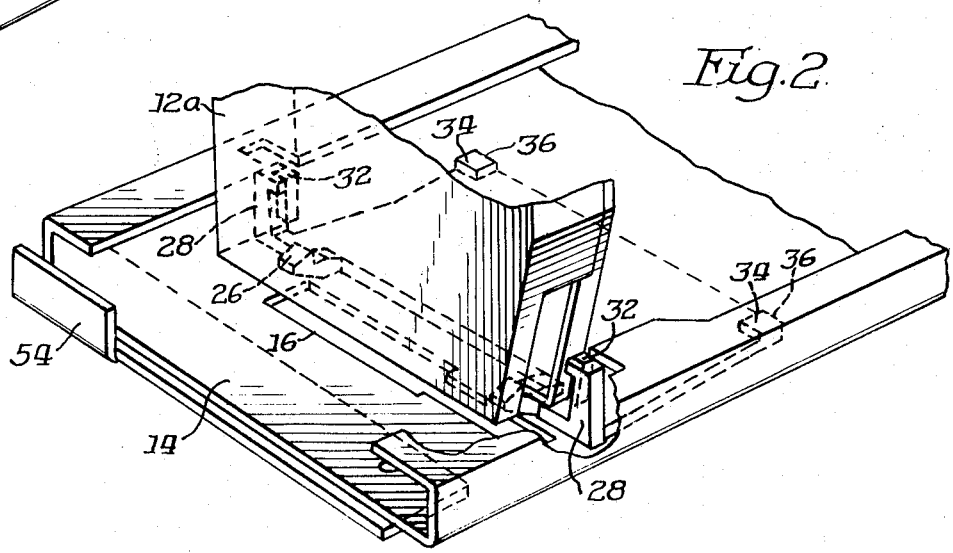
FIG. 2 is a perspective view of part of FIG. 1 showing the first cassette at the projection station.

An escapement member 24 is depicted in FIG. 7. It includes a pair of front stop members 26 and a pair of side stop members 28. Front stop members 26 are designed to engage abutments 30 formed in the underside of the cassette as shown in FIG. 3. Side stop members 28 are designed to engage the abutments 32 which project from the side walls of the cassettes as shown in FIG. 2.

The escapement member 24 is mounted to the underside of the well 14. A pair of posts 34 nestle in a pair of corresponding apertures 36 formed in the well 14, as best seen in FIGS. 2 and 9. The posts 34 fit loosely within the apertures 36 so the escapement member 24 may pivot about an axis passing approximately through the posts 34.

A pair of compression strings 38 bias the escapement member into juxtaposition with the underside of the well 14 (FIG. 8). The side stops 28 pass through apertures 40 formed in the well 14 and the front stops 26 pass through apertures 42 (FIG. 9). A manually operable member 44 acts through a rod 46, a lever 48 and a link 50 to reciprocate the plate 24 by depressing and releasing the manual operable member 44.

INDEXING OPERATION

Briefly, the supply of cassettes 12 are sequentially positioned at the projection aperture by depressing and releasing the manually operable member 44. That reciprocating motion causes the front stops 26 and the side stops 28 to alternately engage their respective abutments 30, 32 and index the supply through the projector.

FIG. 1 depicts the condition of the indexing apparatus just after a supply of cassettes 12 has been placed in the well 14. To do so the pusher 18 was slid to the right, the supply dropped into the well 14 and the pusher 18 released. The action of the negator springs 20 causes the pusher to slide the supply leftwardly until the leading edge 52 of the first cassette 12a engages the front stops 26. It should be pointed out that in the normal operation of the indexing mechanism the only time that the front stops 26 engage the leading edge of a cassette is when the supply has first been positioned in the well. As shown in FIG. 1 the first cassette 12a is not positioned over the projection station 16.

To index the first cassette 12a into the projection station 16 the manually operable member 44 is depressed and the front stops 26 are lowered out of engagement with the leading edge 52 of the first cassette 12a. The pusher 18 then acts on the supply 12 to move it leftwardly until the side stops 28 engage the side abutments 32 formed on the cassettes 12. This is depicted in FIG. 2 and as can be seen therein the first cassette 12a has not yet reached the projection station 16. Upon releasing the manually operable member the side stops 28 raise up and over the side abutments 32 permitting the supply 12 to move further to the left until the front stops 26 engage the front abutments 30 as depicted in FIG. 3. At this point the first cassette 12a is in operable relationship with the projection stations 16.

After the film in cassette 12a is projected it would be desired to sequence the second cassette 12b into operable relationship with the projection station 16. To do so, once again the manually operable member 44 is depressed to move the front stops 26 out of engagement with the front abutments 30 formed on the first cassette 12a. The supply will move leftwardly until the side stops 32 on the second cassette 12b engage the side stops 28 as shown in FIG. 4.

At this point the manually operable member is released, the escapement plate 24 rises, and the side stops 28 rise up and over the side abutments 32 allowing the supply 12 to move leftwardly until the front stops 26 engage the front abutments 30 on the second cassette 12b as shown in FIG. 5.

Obviously this cycle may be repeated again and again until the supply is exhausted. As the supply moves leftwardly it is supported by a rotatable arm 54 as shown in FIGS. 1 and 2. For this indexing mechanism to function properly at least one of the stop members 26, 28 must be in interfering relationship with the travel path of its respective abutment members at all times. Otherwise, the supply 12 would simply be pushed out of the well 14 upon depressing the manually operable member to a particular point.

In this preferred embodiment the movement of the cassettes 12 may be reversed to reproject a given reel of film. In FIG. 5, cassette 12b is positioned at the projection station 16. If the user wished to reproject the film in cassette 12a he would merely slide the supply rightwardly until the front stop member 26 entered the front abutments 30 of cassette 12a. While the supply was being slid rightwardly the leading edge of cassette 12b depressed the front stops 26 by sliding on the sloped upper surface thereof. In this manner the upper surface of the front stops 6 acts as a cam surface.

While in this preferred embodiment the escapement plate 24 has been illustrated as being spring biased into juxtaposition with the wll 14 it is equally apparent with an appropriate modification of the manually operable member and its respective linkages the escapement plate 24 could be biased out of the well 14.

Thus an improved indexing mechanism has been described. It requires neither a movable tray nor a complex mechanism to cycle a plurality of cassettes to supply station of a cassette movie projector.

What is claimed is:

1. In a movie projector capable of projecting film contained in a cassette, the indexing apparatus comprising:

a well for receiving a stack of cassettes;
an aperture in said well defining a projection station;
a pusher disposed in said well;
spring means for biasing said pusher toward said projection station;
an escapement member including a generally horizontally disposed frame pivoted at a rear portion thereof to the underside of said well;
a first pair of stops on said escapement member for engaging the underside of said cassettes, said first pair of stops being disposed on a front portion of said frame;
a second pair of stops on said escapement member for engaging side abutments on said cassettes, said second pair of stops being disposed on a side portion of said frame adjacent to said front portion of said frame;
apertures in said well for permitting said stops to pass therethrough;
spring means for biasing said first pair of stops into said well; and
manually operable means for reciprocating said escapement member such that said first and second stops alternately engage said cassettes and said cassettes sequentially are positioned at said projection station.

2. The indexing apparatus set forth in claim 1 wherein the upper surface of said first pair of stops is sloped to permit reprojection of a cassette.

3. In a film projector, the combination comprising:
a well for receiving a supply of film containing cassettes stacked in side-by-side relation, said cassettes including a first abutment means on a side edge thereof and a second abutment means on the underside thereof;
an aperture in said well defining a projection station;
means in said well for urging said supply of cassettes toward said projection station;
an escapement member including a generally horizontally idsposed frame pivoted at a rear portion thereof to the underside of said well and including side stop means and front stop means for alternately engaging said first abutment means and said second abutment means, respectively, said front stop means being disposed on a front portion of said frame, said side stop means being disposed on a side portion of said frame adjacent to said front portion of said frame; and
means for pivoting said escapement member from a normal position to a lowered position, said pivoting means lowering said front stop means out of engagement with said second abutment means on the underside of said cassette and lowering said side stop means into engagement with said first abutment means on the side of said cassettes.

4. The combination of claim 3 wherein an upper surface of said front stop means is sloped to permit reprojection of a cassette.

* * * * *

UNITED STATES PATENT OFFICE
CERTIFICATE OF CORRECTION

Patent No. 3,787,115  Dated Jan. 22, 1974

Inventor(s) JOERG FISCHER

It is certified that error appears in the above-identified patent and that said Letters Patent are hereby corrected as shown below:

IN THE SPECIFICATION:

Column 1, line 61, after "movie", change "projctor" to --projector--.

Column 3, line 45, after "stops", change "6" to --26--.

Column 3, line 48, after "the", change "wll" to --well--.

IN THE CLAIMS:

Column 4, line 40, change "idsposed" to --disposed--.

Signed and sealed this 11th day of June 1974.

(SEAL)
Attest:

EDWARD M. FLETCHER, JR.
Attesting Officer

C. MARSHALL DANN
Commissioner of Patents